United States Patent [19]

Wristers

[11] 4,262,104
[45] Apr. 14, 1981

[54] TITANIUM TRICHLORIDE CATALYST COMPLEX AND PROCESS FOR THE PRODUCTION THEREOF

[75] Inventor: Harry J. Wristers, Baytown, Tex.

[73] Assignee: Exxon Research & Engineering Co., Florham Park, N.J.

[21] Appl. No.: 11,340

[22] Filed: Feb. 12, 1979

Related U.S. Application Data

[62] Division of Ser. No. 811,507, Jun. 30, 1977, Pat. No. 4,151,112.

[51] Int. Cl.$^3$ .......................... C08F 4/66; C08F 10/06
[52] U.S. Cl. .................................... 526/119; 526/142; 526/144; 526/351
[58] Field of Search ................................ 526/119, 142

[56] References Cited

U.S. PATENT DOCUMENTS

| | | | |
|---|---|---|---|
| 4,123,387 | 10/1978 | Shiga et al. | 526/142 |
| 4,127,504 | 11/1978 | Ueno et al. | 526/142 |
| 4,136,243 | 1/1979 | Appleyard et al. | 526/142 |

FOREIGN PATENT DOCUMENTS

| | | | |
|---|---|---|---|
| 2264560 | 5/1974 | Fed. Rep. of Germany | 526/119 |
| 2320309 | 3/1977 | France | 526/142 |

*Primary Examiner*—Edward J. Smith
*Attorney, Agent, or Firm*—B. C. Cadenhead; M. B. Kurtzman

[57] ABSTRACT

A titanium trichloride catalyst complex is produced by reducing titanium tetrachloride with an organo-metal compound and then activating the resulting reduced solids by treatment with a chlorinated hydrocarbon and titanium tetrachloride in the presence of a Lewis base complexing agent. The employment of the chlorinated hydrocarbon and titanium tetrachloride in the presence of the Lewis base complexing agent unexpectedly produces a synergistic effect whereby activating conditions, e.g., temperature, time and TiCl$_4$ concentration can be employed resulting in a titanium trichloride complex having superior alpha-olefin polymerization properties as compared to titanium trichloride catalyst complexes obtained by treatment under the same conditions in the absence of either titanium tetrachloride or chlorinated hydrocarbon. Moreover, unexpectedly high yields of activated catalyst can be recovered without loss of activity.

7 Claims, No Drawings

TITANIUM TRICHLORIDE CATALYST COMPLEX AND PROCESS FOR THE PRODUCTION THEREOF

This is a division of application Ser. No. 811,507, filed June 30, 1977, now U.S. Pat. No. 4,151,112.

BACKGROUND OF THE INVENTION

1. Field of the Invention

The present invention relates to titanium trichloride catalytic complexes useful as a catalyst component for the stereoregular polymerization of alpha-olefins and more particularly pertains to a novel process for preparing a titanium trichloride catalyst complex having excellent alpha-olefin polymerization properties, e.g., stereospecificity, catalytic efficiency and narrow particle size distribution, in high yields.

2. Discussion of the Prior Art

As a method of producing crystalline polyolefin, it has been widely known to use a polymerization catalyst system comprising, in combination, a catalyst component consisting of a low valence transition metal halide and an organo-metal halide compound. More particularly, on a commercial scale, a titanium trichloride composition has conventionally been used as the low valence metal halide in combination with an aluminum alkyl compound as co-catalyst or activator.

There are many techniques described in the literature for preparing a titanium trichloride composition useful as catalyst in alpha-olefin polymerization. Generally speaking, several of such techniques include reducing titanium tetrachloride with hydrogen or aluminum powder at high temperature, followed by crushing the resulting reduced product for activation. Such catalyst components are widely used commercially, but leave much to be desired. More particularly, the polymerization speed and stereoregularity of such titanium trichloride catalysts require the utilization of a large amount of the expensive catalyst in alpha-olefin polymerization while a great cost is simultaneously required for treatment of non-crystalline polymers produced as byproduct. Moreover, the grinding step required in activating such titanium trichloride compositions results in wide particle size distribution so that polymer obtained by using such catalyst components also has wide particle size distribution, resulting in trouble in handling such polymers.

Many efforts have been made to overcome the aforementioned disadvantages. As a method of modifying the titanium trichloride composition, it has been proposed to add metal halides, alkyl aluminum compounds, halogenated hydrocarbons, ethers, esters, ketones, etc. More specifically, several references have described reduction of titanium tetrachloride with aluminum metal in the presence of certain halogenated hydrocarbons or treating the reduced product therewith. See, for example, U.S. Pat. No. 3,365,434.

It has also been proposed to add certain halogenated hydrocarbons to aluminum metal or hydrogen reduced titanium trichloride prior to or during the grinding-activation step. See U.S. Pat. No. 3,701,763; U.S. Pat. No. 3,560,146; British Pat. No. 1,414,312 and Japanese Pat. No. J7600097, both to Mitsubishi Petrochemical Company Ltd.; U.S. Pat. No. 3,875,126; Japanese application No. 64/24272, published Oct. 29, 1964, to Mitsui Chemical. Further, other references have described extracting resulting ground or pulverized aluminum metal reduced titanium trichloride compounds with certain halogenated hydrocarbons. See U.S. Pat. No. 3,701,763; U.S. Pat. No. 3,850,899; and British Pat. Nos. 1,336,770; 1,359,328; and 1,351,822, to name a few.

These methods, as well as others described in the literature employing other modifiers as mentioned hereinbefore, however, have not overcome the disadvantages associated with such titanium trichloride catalysts. Such modifications have not sufficiently improved particle size distribution, stereospecificity and catalytic activity of such catalysts.

Other techniques known in the art for preparing titanium trichloride catalyst components, generally speaking, include reducing titanium tetrachloride with an organo-metal compound, particularly an organoaluminum compound, at low temperature. Such techniques have the advantage in producing a catalytic component with a relatively even particle size; however, the resulting titanium trichloride composition obtained is normally a brown beta-crystalline type titanium trichloride with alpha-olefin polymerization properties which are very inferior. However, as known, such brown beta-type titanium trichloride compositions can be activated by crystal conversion to a more active violet, or purple, titanium trichloride normally having predominant alpha, gamma or delta crystalline structures.

More particularly, it is known that the brown beta-type titanium trichloride can be converted to more active, i.e., more stereospecific, higher catalytic activity, violet titanium trichloride by heating at not greater than about 200° C., usually about 150°–160° C. See, for example, U.S. Pat. No. 2,971,925 to Winkler et al, U.S. Pat. No. 3,261,821 to Vanderberg, U.S. Pat. No. 3,562,239 to De Jong et al and U.S. Pat. No. 3,979,372, to name a few. However, as known, the polymerization properties of polymerization speed and stereoregularity of such $TiCl_3$ compounds when used as a polymerization catalyst are not superior to the aforementioned aluminum-reduced pulverized titanium trichloride compositions.

Another technique for activating beta-type titanium trichloride compounds prepared by organo-metal reduction of $TiCl_4$ which has developed considerable interest in the industry has been described in British Pat. Nos. 1,391,067 and 1,391,068 to Solvay et Cie. Thus, in these patents, there is described a method of preparing a catalyst component capable of giving relatively high polymerization speed, high stereoregularity and excellent particle size distribution by reducing titanium tetrachloride with an aluminum alkyl halide at low temperature to form a beta-type titanium trichloride composition and then treating it with a complexing agent and titanium tetrachloride to convert into a violet delta-type catalyst solid. However, this method has the disadvantage that, in order to get high polymerization activity, it is necessary in the activation step to use titanium tetrachloride in high concentrations of 15% by volume or more, preferably 30–40% by volume, as described in the patents. Moreover, it has been found that when using a complexing agent other than diisoamyl ether, the activated titanium trichloride composition is not substantially improved. Furthermore, when certain ethers are substituted, e.g., n-butyl ether, severe fracturing of the catalyst solids occurs with the required high concentrations of titanium tetrachloride. As known, diisoamyl ether and titanium tetrachloride reagents are expensive, thus the production costs of a satisfactory catalyst component in accordance with this described method on a commercial scale is high. Moreover, the necessary employment of titanium tetrachloride in high concentrations in the aftertreatment step presents safety hazards.

Yet another technique for activating beta-type titanium trichloride compounds, obtained by organometal reduction of TiCl$_4$ at low temperature, has been proposed which includes treating the beta-type titanium trichlorides with certain halogenated hydrocarbons. More particularly, in Japanese Pat. Nos. J-50108-383 and J-50108-384 to Mitsubishi Petrochemical Company Ltd. (1975), a process is described in which TiCl$_4$ is reduced at low temperature with an aluminum alkyl halide and the resulting brown precipitate is aftertreated with isoamyl ether or alcohol and carbon tetrachloride to give a red-purple solid which allegedly has excellent alpha-olefin polymerization properties.

Similiarly, Japanese Pat. No. JA-7206409 (1972) to Mitsui Petrochemical Co. describes a method whereby titanium tetrachloride is reduced with an organoaluminum halide in the presence of a halomethane, e.g., CCl$_4$, HCCl$_3$, etc., or the halomethane added to the reduction slurry, followed by heating.

Additionally, Japanese Pat. No. J 51030593 to Mitsubishi Chemical Ind. K.K. discloses treating an organoaluminum reduced TiCl$_4$ solid with a complex-forming agent, e.g., an ether, and carbon tetrachloride or titanium tetrachloride.

In recently published Belgian Pat. No. 842,591 to Shell International (1976), a process is described for converting beta-type TiCl$_3$ to the more active violet TiCl$_3$ by heating the beta-TiCl$_3$ in the presence of an organic halide, specifically, certain chlorinated hydrocarbons as specified. As disclosed, the brown TiCl$_3$ reduced solid is preferably pretreated with a complexing agent, an ether, and washed prior to the organic halide-heat treatment. The addition of the organic halide is described as causing the conversion of the catalyst at a lower temperature, resulting in higher catalyst activity.

Such methods using organic halides, however, have the disadvantage that, in order to obtain a titanium trichloride catalyst component having alpha-olefin polymerization properties, i.e., high stereospecificity and catalytic efficiency, superior to commercially available TiCl$_3$ catalysts obtained by aluminum reduction and grinding, referred to above, there is necessarily a significant sacrifice in catalyst yield. As known, many organic halides, e.g., chlorinated hydrocarbons, act as solvents for titanium trichloride compositions. Hence, in such known processes there must be some sacrifice in either catalyst yield or overall catalytic performance achieved.

SUMMARY OF THE INVENTION

The present invention provides a process for the production of a titanium trichloride catalyst complex for use in the stereopolymerization of alpha-olefins which overcomes the above-mentioned disadvantages associated with known processes. In accordance with the present invention, a titanium trichloride reduced solids, obtained by the reduction of titanium tetrachloride with an organo-metal compound at low temperature, is treated with a chlorinated hydrocarbon and titanium tetrachloride in the presence of a complexing agent. The chlorinated hydrocarbon and titanium tetrachloride in the presence of the complexing agent unexpectedly exert a synergistic effect whereby a crystal conversion of the titanium trichloride reduced solids is obtained without sacrifice in catalyst yield. Additionally, the synergistic activating treatment of the present invention permits the production of a titanium trichloride catalyst complex under mild activation conditions, such as temperature, time and titanium tetrachloride concentration, which resulting titanium trichloride catalyst complex has alpha-olefin polymerization properties superior to a titanium trichloride catalyst complex obtained under the same conditions in the absence of either the titanium tetrachloride or the chlorinated hydrocarbon.

Thus, the present provides a novel process for producing a titanium trichloride catalyst complex that can exhibit very excellent properties or performances when used as a catalyst for the polymerization of alpha-olefins in high yields, thereby significantly reducing catalyst and polymer manufacturing costs, as well as reducing safety hazards associated with utilizing titanium tetrachloride in high concentrations. Moreover, the novel process enables the utilization of many types of chlorinated hydrocarbons which heretofore have been found to be unable to activate the beta catalysts by conversion or to result in extremely low yields of activated catalyst.

DETAILED DESCRIPTION OF THE INVENTION

The titanium trichloride-containing reduced solid obtained by reducing titanium tetrachloride with an organo-metal compound according to the present invention (which will hereinafter be referred to as "reduced solid") is a reduced solid whose color is usually brown to red-violet and which contains metal compounds, for example, aluminum compounds, which has a complicated composition. In these reduced solids, the titanium trichloride component is usually of the beta-type crystalline structure. As the organo-metal compound, there are generally used, individually or in combination, organoaluminum compounds, organomagnesium compounds and organozinc compounds (which will hereinafter be referred to as "organo-metal compounds"). Preferably, the reduction is carried out by the use of organoaluminum compounds. The reduced solid obtained in this way contains a metal compound or a mixture or complex compound thereof, in particular, an aluminum compound or a mixture or a complex compound thereof in uniform state, which possibly interact with complexing agent, chlorinated hydrocarbon and titanium tetrachloride to some extent, thus improving the catalytic properties of the composition in conventional alpha-olefin polymerization.

The process of the invention is deemed to be capable of increasing the alpha-olefin polymerization properties and improving titanium trichloride component catalyst yields through employment of any reduced solid described above by any process known in the art. That is to say, the reduction step of titanium tetrachloride with an organo-metal compound is not critical in the present invention and, accordingly, any technique heretofore described in the art or hereafter discovered may be employed to obtain the reduced solids.

In any event, it is preferred in the reduction step to use an organoaluminum compound represented by the general formula $R_nAlX_{3-n}$, wherein R represents an alkyl group or aryl group, X represents a halogen atom and n represents a suitable numeral within the range of $1 \leq n \leq 3$, or a mixture or a complex compound thereof. Usually, alkyl aluminum compounds having 1 to 18 carbon atoms, preferably 2 to 6 carbon atoms, are used, such as trialkyl aluminums, dialkyl aluminum halides, monoalkyl aluminum dihalides, and alkyl aluminum sesquihalides, mixtures or complex compounds thereof. Examples of the trialkyl aluminum are trimethyl aluminum, triethyl aluminum and tributyl aluminum. Examples of dialkyl aluminum halide are dimethyl aluminum chloride, diethyl aluminum chloride, dibutyl aluminum chloride, diethyl aluminum bromide and diethyl aluminum iodide. Examples of the monoalkyl aluminum dihalide are methyl aluminum dichloride, ethyl aluminum dichloride, butyl aluminum dichloride, ethyl aluminum dibromide and ethyl aluminum diiodide. Moreover, ethyl aluminum sesquichloride is given as an example of the alkyl aluminum sesquichloride. Triethyl aluminum, diethyl aluminum chloride, ethyl aluminum dichloride, ethyl aluminum sesquichloride or their mixtures or complex compounds, for example, a mixture of diethyl aluminum chloride and ethyl aluminum dichloride is particularly preferable because these compounds are readily obtainable commercially and exhibit excellent effects.

The reduction of titanium tetrachloride is ordinarily carried out by adding the above-described organometal compound or its solution dropwise to a solution of titanium tetrachloride dissolved in an inert diluent such as an aliphatic hydrocarbon having 5 to 12 carbon atoms at a temperature of from about $-50°$ C. to about $+30°$ C. for a period of time of about 30 minutes to about 3 hours, although the reverse addition method can be employed.

The quantity of organo-metal compound used is ordinarily 0.75 to 5 gram atoms as metal per 1 gram atom of titanium. When titanium tetrachloride is reduced with diethyl aluminum chloride (DEAC) or a mixture of DEAC and ethyl aluminum dichloride (EADC), these reagents are preferably mixed in a molar ratio of Ti Cl$_4$ : DEAC=1:0.75 to 1:2 and Ti Cl$_4$ : DEAC : EADC=1:0.5:0.5 to 1:1:1.

Preferably, the temperature of the reduction is maintained relatively constant until all reagents have been added. The mixture is then usually aged at an elevated temperature of from about 0° to about 100° C. for about 1 to 3 hours, but this treatment is not always necessary. The resulting reduced solid, which usually contains titanium trichloride in the brown beta crystalline structure, depending upon specific organometal compounds, reagent ratios, reaction conditions, etc., used, is then separated by a suitable method, optionally washed with an inert diluent and optionally dried.

In accordance with the invention, the reduced solids product thus obtained is then subjected to an activation step by contact with a Lewis base complexing agent, a chlorinated hydrocarbon, and a minor amount of titanium tetrachloride, preferably at an elevated temperature until a crystal conversion of the titanium trichloride component is obtained. Usually, the titanium trichloride component is converted to the purple or violet form normally indicative of an alpha, gamma or delta crystalline-type titanium trichloride.

This contacting can be effected in numerous ways, such as by adding the above described reduced solids, optionally in an inert diluent, such as aliphatic hydrocarbon, to a mixture of complexing agent, chlorinated hydrocarbon and titanium tetrachloride, reverse addition thereof, any sequential addition of these activation compounds to the reduced solids and so forth. Additionally, the reduced solids can be pretreated with the complexing agent, preferably at a temperature of about ambient to about 80° C. to obtain a complexed reduced solids component as described in several prior art references, e.g., British Pat. No. 1,391,067; Belgian Pat. No. 842,591; and Japanese Pat. No. J-50108-383 referred to hereinabove. This resulting complexed reduced solids can then be contacted with the chlorinated hydrocarbon and titanium tetrachloride for the above-mentioned crystal conversion of the reduced solids product.

However, it it preferred to carry out the activation step whereby the complexing agent, chlorinated hydrocarbon and titanium tetrachloride are added to the reduced solids, or vice versa, with no washing or separation step between any reactant addition. Such technique is more simple and produces optimum catalyst activation and yield.

The activation conditions employed may vary widely, depending upon the specific chlorinated hydrocarbon, complexing agent and concentration of titanium tetrachloride employed. Most unexpectedly, however, the utilization of the chlorinated hydrocarbon in combination with titanium tetrachloride in the presence of the complexing agent results in a crystal conversion of the titanium trichloride reduced solids product at conditions, e.g., an elevated temperature, and treatment time, much lower and shorter than is required to obtain such crystal conversion by treatment of the same reduced solids in the absence of either the chlorinated hydrocarbon or the titanium tetrachloride where the titanium tetrachloride is similarly used at the same low concentration. Moreover, as illustrated more particularly in the following Examples, the employment of the synergistic activation mixture of the present invention results in the production of a titanium trichloride catalyst complex having significantly superior alpha-olefin polymerization properties, as evidenced by stereospecificity and/or catalyst efficiencies, as compared to a titanium trichloride catalyst complex produced under the same activation conditions in the absence of one of either the titanium tetrachloride or the chlorinated hydrocarbon.

Another significant aspect of the present invention is that, through the utilization of milder activation conditions, catalyst yield can be significantly increased without a concomitant decrease in catalytic activity, e.g., alpha-olefin polymerization properties. In fact, as illustrated in the following Examples, catalyst yield is not significantly affected even when more severe temperature conditions are employed which heretofore were found necessary to obtain high catalytic activity.

The complexing agent used in the present invention may be any compound heretofore employed for complexing titanium trichloride catalytic compounds. See, for example, British Pat. No. 3,391,067. As known, such complexing agents are compounds containing one or more electron donating atoms or groups, preferably Lewis bases. Such Lewis base complexing agents include ethers, thioethers, thiols, organophosphorus compounds, organonitrogen compounds, ketones, esters and the like.

Useful examples of the ether are diethyl ether, diisopropyl ether, di-n-butyl ether, diisobutyl ether, propylphenyl ether, diisoamyl ether, di-n-hexyl ether, di-2-ethylhexyl ether, di-2-ethylheptyl ether, allyl ethyl ether, allyl butyl ether, diphenyl ether, anisole, phenetole, chloroanisole, p-methylanisole, bromoanisole, dimethoxybenzene, etc. Useful examples of the thioether are diethyl thioether, di-n-propyl thioether, dicyclohexyl thioether, diphenyl thioether, ditolyl thioether, ethyl phenyl thioether, propyl phenyl thioether, diallyl thioether, etc. Useful examples of the organo phosphorus compound are tri-n-butylphosphine, triphenylphosphine, triethyl phosphite, tributyl phosphite, etc. Useful examples of the organo nitrogen compound are diethylamine, triethylamine, n-propylamine, di-n-propylamine, tri-n-propylamine, aniline, dimethylaniline, etc. In particular, ethers are preferably used and, above all, those having 4 to 16 carbon atoms are more desirable. From the standpoint of economy, n-butyl ether is the most preferred.

As the chlorinated hydrocarbon, there can be used chlorinated saturated or unsaturated aliphatic hydrocarbons or chlorinated aromatic hydrocarbons or their isomers, preferably containing 1 to 20 carbon atoms.

Examples of useful saturated aliphatic chlorinated hydrocarbons include the chlorinated methanes, such as carbon tetrachloride, chloroform, dichloromethane, chlorinated ethanes, such as hexachloroethane, pentachloroethane, tetrachloroethane, etc., chlorinated propanes, butanes, and so forth. Useful unsaturated chlorinated hydrocarbons include, for example, tetrachloroethylene, allyl chloride, 1,3-dichloropropane, 1,3-dichlorobutene-2, 1,4-dichlorobutene-2, hexachloro-n-butene-2, hexachlorocyclopentadiene, etc. Further, by way of example, useful halogenated aromatic hydrocarbons include the chlorinated benzenes, e.g., hexachlorobenzene, benzyl chloride, benzyl trichloride, as well as those having a chlorinated side chain.

It is to be understood that the above listing of example compounds is not intended to be complete. Any chlorinated hydrocarbon can be used in the present invention. Those chlorinated hydrocarbons having 1 to 8 carbon atoms and 2 to 6 chlorine atoms have been found to have larger effects and, accordingly, are more preferred.

It is particularly preferred to utilize $C_2$ chlorinated hydrocarbons which, for example, include hexachloroethane, pentachloroethane, tetrachloroethane, trichloroethane, dichloroethane, tetrachloroethylene, trichloroethylene, dichloroethylene and the like. The beneficial effect of such $C_2$ chlorinated hydrocarbon increases with saturation and the increase of the number of chlorine atoms per molecule. Hence, hexachloroethane is most preferred above all inasmuch as optimum results have been obtained therewith in regard to alpha-olefin polymerization properties of stereospecificity, catalytic efficiency, polymer particle size distribution as well as catalyst yield.

A most important aspect of the present invention is the discovery that the synergistic activation system of the invention significantly improves TiCl$_3$ crystal conversion and catalyst yield when chlorinated hydrocarbons with relatively stable chloride-carbon bonds, e.g., vinyllic chloride bonds, chloromethanes, etc., are employed as an activating agent. Heretofore, the utilization of such chlorinated hydrocarbons with relatively stable-chloride bonds, when utilized alone or in the presence of a complexing agent, would not produce significant crystal conversion of a beta-type titanium trichloride component except under relatively severe activation conditions which resulted in relatively low activated catalyst yields, e.g., below about 50%, theoretical. Unexpectedly, these relatively stable chlorohydrocarbons in the presence of a minor amount of TiCl$_4$ and complexing agent readily convert brown titanium trichloride compounds to the more active purple form under comparatively mild temperature conditions and catalyst yield is significantly increased. Thus, the present invention permits the utilization of a wide variety of chlorinated hydrocarbons as mentioned above in the production of titanium trichloride catalyst components in high yields.

Another significant aspect of the present invention is the discovery that only a minor amount of titanium tetrachloride is required to obtain the synergism of the activation step. Thus, the present invention does not suffer from the disadvantages associated with prior art techniques necessarily utilizing high concentrations of titanium tetrachloride in order to obtain a catalyst with superior olefin polymerization properties.

For the above-described activation treatment, there are optimum conditions depending upon the property, composition and the like of the reduced solid, titanium tetrachloride concentration, and particular Lewis base complexing agent and chlorinated hydrocarbon employed, etc. Generally, the treatment is carried out at an elevated temperature of about 50° C. to about 150° C. for about 5 minutes to about 20 hours, preferably 30 minutes to about 5 hours at about 60° to about 80° C. At a low temperature, this treatment should be carried out for a long time and at a high temperature, it should be carried out for a relatively short time. The quantities of chlorinated hydrocarbon, complexing agent and titanium tetrachloride are not particularly limited; however, as noted hereinabove, only a minor amount of titanium tetrachloride is required. This usually ranges in an amount of about 0.1 to about 2.0 mols titanium tetrachloride per one mol titanium trichloride in the reduced solids. A preferred range is about 0.5 to about 1.25 mols TiCl$_4$ per mol titanium trichloride per reduced solids titanium trichloride. The titanium tetrachloride is usually present in the activation step in a concentration of about 2 to about 15 volume percent, based upon the total volume. Preferred titanium trichloride concentration is about 5 to about 10 volume percent. Such titanium tetrachloride concentration can be obtained by utilization of an inert diluent, if necessary.

The Lewis base complexing agent is usually employed within the range of about 0.1 to about 2.0, preferably 0.5 to about 1.0, mols per one mol of reduced solids titanium trichloride. The chlorinated hydrocarbon is usually employed in an amount of 0.1 to about 10, preferably about 0.7 to about 2 mols per one mol titanium trichloride of the reduced solids.

In a preferred embodiment where hexachloroethane is utilized as the chlorinated hydrocarbon, it is particularly preferred to carry out the activation step at an elevated temperature within the range of about 60° to about 85° C. for about 30 minutes to about 3 hours. As illustrated in the following Examples, the resulting titanium trichloride catalytic complex has excellent stereospecificity, catalytic efficiency and particle size distribution when used in a conventional process for alpha-olefin polymerization. Additionally, the activated titanium trichloride catalyst complex thus produced can be recovered in excellent catalyst yield, approaching or equal to 100% theoretical.

The titanium trichloride catalyst complex resulting from the above-described activation step of the present invention can be recovered by separation from the chlorinated hydrocarbon, complexing agent, titanium tetrachloride and inert solvent by any known technique and can be optionally washed with an inert solvent. The recovered catalyst can then be contacted with an organoaluminum compound as a co-catalyst in a conventional manner as it is or after drying, thus obtaining a catalyst for the polymerization of alpha-olefins.

The titanium trichloride catalyst of the present invention is ordinarily used as a catalyst for the polymerization of alpha-olefins in contact with an organo-metal compound which is used as a co-catalyst for the Ziegler-type catalyst, for example, monoalkyl aluminum dichloride, in conjunction with Lewis bases, dialkyl aluminum monochloride or trialkyl aluminum can be used. If desirable, various compounds, for example, complexing agents such as used in the present invention, can further be added as a third component. The titanium trichloride catalyst component of the present invention is very excellent as a catalyst for the homopolymerization or copolymerization of alpha-olefins such as propylene, butene-1,4-methylpentene-1, etc., and can give uniform polymer grains with a high polymerization activity and high stereoregular polymer ratio in the polymerization of such alpha-olefins in a gaseous phase, liquid monomer or inert solvent. Moreover, as previously pointed out, the inventive process results in such titanium trichloride catalyst in high yield, thus reducing overall catalyst and alpha-olefin polymerization costs.

In order to illustrate the present invention, the following Examples are given. In each Example, the formation of catalyst was carried out by reduction and crystal conversion in the following equipment and following procedure, unless otherwise specified.

A 500 ml round-bottom flask, without baffles, equipped with a flat-bladed mechanical stirrer, a thermometer and an addition port is cooled to $-5°$ C. in a Dry Ice/isooctane bath. The stirrer had two blades mounted at 180°, with an overall diameter of 6 cm. The entire assembly and all catalyst preparations are maintained in an inert atmosphere. To the cooled flask, $TiCl_4$ (1.5–3.0 molar in n-heptane) is added and the solution is stirred at a rate between 210 and 400 rpm. The stirring rate is maintained as closely as possible to a specific value during the preparation, i.e., $250\pm10$ rpm. To the $TiCl_4$ solution, diethylaluminum chloride or other reducing agent (1.0 to 3.5 molar in n-heptane) is added over a period of three hours. When all the diethylaluminum chloride solution has been added (1 mol of $TiCl_4$/mol of diethylaluminum chloride [DEAC]), the mixture is warmed to $+65°$ C. at a rate of 1.0° C. per minute. The stirred reaction mixture is maintained at this temperature for one hour. The reaction mixture is then cooled and the catalyst is filtered and washed twice with boiling heptane. This solid catalyst is dried and weighed and is referred to as the brown, beta-crystalline reduced solid.

To a 250 cc thick-walled bottle are added a magnet, hydrocarbon solvent, e.g., hexane or heptane, and 5.0 g of reduced solid. To the slurry are added the chlorohydrocarbon (neat or in hydrocarbon solution), $TiCl_4$, and the complexing agent. The reaction mixture is heated to the specified temperature, held at that temperature for a specified length of time, and the final reaction mixture is cooled, filtered and washed five times with 50 cc frac-tions of boiling heptane. The final catalyst is dried under reduced pressure, weighed and used in the following polymerization tests.

The catalysts were tested for polymerization by conventional techniques (reaction conditions $65°\pm0.1°$ C.; $765\pm5$ mm total pressure [$C_3=$ and $C_7$ diluent]; 2 hours reaction time; 2$AlEt_2Cl$:1$TiCl_3$ mol ratio; 5–7 mmols of $TiCl_3$ catalyst per 500 cc of heptane polymerization diluent). Catalytic efficiency was determined by dividing the total amount of polymer produced by the amount of catalyst that was used, e.g., gms of dry polymer recovered plus gms of solvent soluble polymer divided by gms of catalyst. Catalyst stereospecificity was determined by hot-heptane insoluble content of resulting polypropylene powder, after propylene and catalyst removal in a conventional manner by extraction with boiling heptane for 1.5 hours using a Soxhlet extractor (referred to hereafter as $C_7$ Insol., %).

EXAMPLE 1

A brown, beta-crystalline reduced solid (5.0 gms) prepared according to the general procedure described above ($TiCl_4$:DEAC mol ratio=1) was added to a 250 ml glass bottle containing a magnet and 33.3 ml of a 0.75 molar solution of hexachloroethane in purified heptane. To this slurry, titanium tetrachloride (2.75 ml) and n-butyl ether (2.53 ml) were added, and the mixture was heated at 65° C. for 2 hours. The mol ratio of the activation system was 0.6 n-butyl ether:1$C_2Cl_6$:1$TiCl_4$ per 1 mol $TiCl_3$ of the reduced solid. The $TiCl_4$ concentration was less than 8 volume percent. After the heating at 2 hours, a resulting purple solid was filtered, washed five times with 50 cc portions of boiling heptane and dried. 3.71 g of catalyst was recovered, which equals to about 100% of the theoretical yield. The catalyst had a composition of 0.09 Al:Ti mol ratio and 92.8 wt. % of the catalyst was comprised of Al,Ti,Cl. The catalyst was then tested in the above-described polymerization system with the following results: catalyst efficiency, w/w,=141; $C_7$ Insol. %=98.4.

COMPARATIVE EXAMPLES 1–6

Several samples (5.0 g) of brown beta-crystalline reduced solid prepared according to the above-described procedure ($TiCl_4$:DEAC mol ratio=1) were separately treated with either n-butyl ether, hexachloroethane, tetrachloroethylene, or $TiCl_4$ at treatment conditions set forth in Table I. The resulting catalysts, along with a commercially available titanium trichloride catalyst, $TiCl_3AA$ ($TiCl_3$ 1.1, an aluminum metal reduced, ballmilled $TiCl_3$ catalyst sold by Stauffer Chemical Company), were then tested by the above-described polymerization system. The results of the polymerization test are set forth in Table I. A comparison of these data illustrates that the activating agents employed by themselves do not result in a $TiCl_3$ catalyst component having catalyst efficiencies and stereospecifities superior to the commercially available titanium trichloride catalyst.

TABLE I

| Comparative Example No. | Activation System[a] E: | Activation System[a] RX: | Activation System[a] TiCl4 | Treatment °C. | Treatment Hrs | Treatment Yield % | Cat. Eff., W/W | C7 Insol. % | Catalyst Properties Composition Mol Ratio Al:Ti | Catalyst Properties Composition Wt. % Al,Ti,Cl[b] |
|---|---|---|---|---|---|---|---|---|---|---|
| 1 | 0 | 0 | 0 | — | — | 100 | 12 | 86.5 | 0.5 | — |
| 2 | 1 | 0 | 0 | 35 | 1 | 100 | 97 | 78 | 0.1 | — |
| 3 | 0 | 0 | 1 | 65 | 2 | 100 | <40 | 92 | 0.3 | 90 |

TABLE I-continued

| Comparative Example No. | Activation System[a] E: | RX: | TiCl₄ | Treatment °C. | Hrs | Yield % | Cat. Eff., W/W | C₇ Insol. % | Catalyst Properties Composition Mol Ratio Al:Ti | Wt. % Al,Ti,Cl[b] |
| --- | --- | --- | --- | --- | --- | --- | --- | --- | --- | --- |
| 4 | 0 | 1[c] | 0 | 65 | 2 | 60 | 9 | 78 | 1.2 | 88 |
| 5 |  | (d) |  | — | — | — | 42 | 93 | 0.33 | 100 |
| 6 | 0 | 1[e] |  | 80 | 3 | 58 | 3 | 73 | — | — |

[a] Mol ratios of BU₂O:chlorinated hydrocarbon:TiCl₄ per 1 mol TiCl₃ in reduced solids.
[b] Weight percent, as determined by x-ray fluorescence.
[c] $C_2Cl_6$
[d] TiCl₃AA (TiCl₃ 1.1 sold by Stauffer Chemical Company)
[e] $C_2Cl_4$

COMPARATIVE EXAMPLES 7-11

Several samples (5.0 g) of brown, beta-crystalline reduced solid prepared according to the general procedure described above (TiCl₄:DEAC mol ratio=1) were treated with combinations of n-butyl ether and TiCl₄ (Comparative Example 7), or sequentially with n-butyl ether and TiCl₄ according to activation conditions described in Example 1 of British Pat. No. 1,391,067 to Solvay & Cie. (Comparative Example 8) and combinations of hexachloroethane and titanium tetrachloride (Comparative Examples 9-11). Details of each experiment and results are set forth in the following Table II, along with such details of Example 1, set forth for comparative purposes. Polymerization tests and catalyst properties were carried out and determined in accordance with the general procedure described above.

peratures employed in those Comparative Examples, the resulting catalyst yield was only 70 and 43%, respectively, based upon theoretical.

A comparison of Comp. Exs. 7 and 9, 10 and 11 to Example 1 clearly verifies the synergism achieved by employing an activation system of chlorinated hydrocarbon, low concentration of TiCl₄ in the presence of the ether complexing agent in accordance with the present invention. At the same treatment temperature employed (65° C.), the inventive activation system provided essentially complete crystal conversion with catalyst properties clearly superior to treatment with activation systems not containing either C₂Cl₆ or TiCl₄ (Example 1 vs. Comp. Exs. 7 and 9). The synergistic activation system also provides a catalyst with polymerization properties superior to that prepared in the absence of TiCl₄ at a higher temperature (Example 1 vs. Comp.

TABLE II

| Comparative Example No. | Activation System[a] E: | RX: | TiCl₄ | Treatment °C. | Hrs | Yield % | Cat. Eff. W/W | C₇ Insol. % | Catalyst Properties Composition Mol Ratio Al:Ti | Wt. % Al,Ti,Cl:[b] |
| --- | --- | --- | --- | --- | --- | --- | --- | --- | --- | --- |
| Ex. 1 | 0.6 | 1 | 1 | 65 | 2 | 100 | 141 | 98.4 | 0.09 | 92.8 |
| 7 | 0.6 | 0 | 2 | 65 | 2 | 81 | 99 | 77 | 0.06 | 92 |
| 8 | 0.9 | 0 | 5 | (35 / 65 | 1 / 2) | 93 | 90 | 98.5 | 0.02 | 85 |
| 9 | 0.6 | 1 | 0 | 65 | 3 | 88 | 121 | 90.4 | 0.10 | 94 |
| 10 | 0.6 | 1 | 0 | 80 | 3 | 70 | 123 | 97.2 | 0.05 | 100 |
| 11 | 0.6 | 1 | 0 | 80 | 5 | 43 | 134 | 97.7 | 0.05 | 90 |

[a] Mol ratios of Bu₂C:C₂Cl₆:TiCl₄ per 1 mol TiCl₃ in reduced solids.
[b] Weight percent, as determined by x-ray fluorescence.

The results in Table II show that catalyst treated with a dilute solution of TiCl₄ (8.4 volume percent TiCl₄) has inferior polymerization properties to one treated sequentially with a concentrated TiCl₄ solution (40 volume percent) (Comp. Ex. 7 vs. Comp. Ex. 8). In Comp. Ex. 7, inadequate crystal conversion was achieved using the dilute TiCl₄ solution as indicated by the low C₇ Insol. % (77%) and concomitant brown color of the activated catalyst observed.

A comparison of Comp. Exs. 8, 9, 10 and 11 shows that it is necessary to use a high treatment temperature (80° C.) in order to obtain good crystal conversion of the catalyst when the activation system consists of n-butyl ether and C₂Cl₆. Specifically, in Comp. Ex. 9, mild treatment (65° C., 3 hours) resulted in a brown-purple catalyst having only 90.4% C₇ Insol. properties. In Comp. Exs. 10 and 11 (80° C., 3 and 5 hours, respectively), good crystal conversion was achieved, as indicated by the resulting purple color and C₇ Insol. % of 97.2 and 97.7, respectively. However, at the high tem- Exs. 10 and 11). Yet, as this latter comparison shows, the synergistic activation system results in the attainment of a 100% catalyst yield, vs. only 70% and 43% yields attained in Comp. Exs. 10 and 11.

EXAMPLES 2-5

Several samples (5.0 g) of brown, beta-crystalline reduced solid prepared according to the general procedure described above (TiCl₄:DEAC mol ratio=1) were added to 250 ml glass bottles containing a magnet and a solution of C₂Cl₆ in n-heptane. To the respective slurries were added specific amounts of TiCl₄ and n-butyl ether and the mixtures were heated for the specified times after which the resulting treated solids were filtered, washed 5 times with boiling heptane (50 cc fractions), dried under reduced pressure, weighed and evaluated in the polymerization system described above. The mol ratios of the activation system reagents, activation conditions and catalyst properties and performance are tabulated in Table III.

TABLE III

| Example No. | Activation System[a] E: | RX: | TiCl$_4$ | Treatment °C. | Hrs | Yield %[c] | Cat. Eff., W/W | C$_7$ Insol. % | Catalyst Properties Composition Mol Ratio Al:Ti | Wt. % Al,Ti,Cl[b] |
|---|---|---|---|---|---|---|---|---|---|---|
| 2 | 0.6 | 1 | 0.2 | 65 | 3 | 107 | 103 | 94.5 | 0.10 | 102 |
| 3 | 0.6 | 1 | 0.5 | 65 | 3 | 110 | 75 | 96.3 | 0.10 | 101 |
| 4 | 0.8 | 1 | 1 | 65 | 2 | 109 | 105 | 95.3 | 0.10 | 92.1 |
| 5 | 0.6 | 1 | 2 | 65 | 2 | 115 | 113 | 98.2 | 0.07 | 100 |

[a]Mol ratios of Bu$_2$O:C$_2$Cl$_6$:TiCl$_4$ per 1 mol TiCl$_3$ in reduced solids.
[b]Weight percent, as determined by x-ray fluorescence.
[c]In cases where yields exceed 100% of theoretical, the added TiCl$_4$ reacts with the EtAlCl$_2$ in the catalyst to form additional delta-TiCl$_3$ in situ.

The data of Table III show the synergism of the activation system of the present invention is achieved at varying concentrations of TiCl$_4$ ranging from 2 volume percent (Example 2) to 4 volume percent (Example 3). In each Example 2-5, the catalyst was recovered in yields of at least 100% theoretical and polymerization properties of efficiency and stereospecificity were excellent. Additionally, it is noted that catalyst yields of the Examples were in excess of 100% theoretical, apparently due to added TiCl$_4$ reacting with ethylaluminum dichloride in the treated catalyst to form additional delta-type TiCl$_3$ in situ. Hence, the present invention provides an additional advantage over techniques which employ only a chlorinated hydrocarbon and/or ether in an activation step.

EXAMPLES 6-15

Several samples (1.0 g) of brown, beta-crystalline reduced solids prepared according to the general procedure described above were respectively added to 250 ml glass bottles, each containing a magnet. To the flasks were added specified amounts of C$_2$Cl$_6$ solution, TiCl$_4$ and a Lewis base complexing agent. The respective slurries were heated at 80° C. for specified lengths of time. Following activations, the catalysts were allowed to settle, filtered, washed, dried and weighed as described hereinabove. Each catalyst sample was then crushed and examined under a microscope to determine their color. The activation conditions and results are tabulated in Table IV.

The results of Table IV show the flexibility of the present invention in the type and amount of Lewis base (ether) used in the activation system. In each Example, crystal conversion of the catalyst was obtained, as demonstrated by the resulting purple color. Additionally, the data of Table IV shows that even at high activation temperature (80° C.), the yield of activated catalyst is the same when TiCl$_4$ is present in the activation system. Compare the results of Table IV, particularly Example 15, to Comparative Examples 10 and 11, Table II. Hence, the synergistic activation system of the invention provides wide latitude in activation conditions of temperature and time to obtain crystal conversion with no loss in catalyst yield.

EXAMPLES 16-23

Several samples (1.0 g) of brown, beta-crystalline reduced solids prepared according to the general procedure described above were added to 250 ml glass bottles, each containing a magnet. To the bottles were added specified amounts of chlorohydrocarbon solutions in n-heptane, TiCl$_4$ and n-butyl ether. The slurries were heated at 65° C. for 3 hours. Following the activation treatment, the catalyst solids were allowed to settle, filtered, washed, dried and weighed as described hereinbefore. The treated catalyst samples were crushed and examined under a microscope to determine their color. Details of the Examples and results are tabulated in Table V.

TABLE IV

| Example No. | Activation System[a] E: | RX: | TiCl$_4$ | E | Treatment °C. | Hrs | Yield % | Catalyst Color |
|---|---|---|---|---|---|---|---|---|
| 6 | 0.6 | 1 | 1 | p-methylanisole | 80 | 5 | 72 | Purple |
| 7 | 0.7 | 1 | 1 | diisopentyl ether | 80 | 3 | 100 | Purple |
| 8 | 0.7 | 1 | 1 | di-n-pentyl ether | 80 | 3 | 100 | Purple |
| 9 | 1 | 1 | 1 | di-n-hexyl ether | 80 | 3 | 100 | Purple |
| 10 | 2 | 1 | 1 | " | 80 | 3 | 100 | Purple |
| 11 | 0.5 | 2 | 1 | " | 80 | 5 | 95 | Purple |
| 12 | 0.5 | 1 | 2 | " | 80 | 1 | 100 | Purple |
| 13 | 0.7 | 1 | 1 | anisole | 80 | 3 | 100 | Purple |
| 14 | 0.7 | 1 | 1 | propyl phenyl ether | 80 | 3 | 100 | Purple |
| 15 | 0.6 | 1 | 1 | n-butyl ether | 80 | 3 | 95 | Purple |

[a]Mol ratios of Lewis base:chlorinated hydrocarbon and TiCl$_4$ per 1 mol TiCl$_3$ in reduced solids.

TABLE V

| Example No. | Activation System[d] E: | RX: | TiCl$_4$ | RX | Treatment °C. | Hrs | Yield % | Catalyst Color |
|---|---|---|---|---|---|---|---|---|
| 16 | 0.6 | 1 | 0 | CCl$_4$ | 65 | 3 | <50 | Brown |
| 17 | 0.6 | 1 | 1 | CCl$_4$ | 65 | 3 | 71 | Purple[b] |
| 18 | 0.6 | 1 | 0 | CHCl$_3$ | 65 | 3 | <30 | Brown |
| 19 | 0.6 | 1 | 1 | CHCl$_3$ | 65 | 3 | >70 | Purple |
| 20 | 0.6 | 1 | 0 | CH$_2$Cl$_2$ | 65 | 3 | <30 | Brown |
| 21 | 0.6 | 1 | 1 | CH$_2$Cl$_2$ | 65 | 3 | >70 | Purple |
| 22 | 0.6 | 1 | 0 | CH$_2$Cl CCl$_3$ | 65 | 3 | <30 | Brown |

TABLE V-continued

| Example No. | Activation System[a] E: | RX: | TiCl₄ | RX | Treatment °C. | Hrs | Yield % | Catalyst Color |
|---|---|---|---|---|---|---|---|---|
| 23 | 0.6 | 1 | 1 | CH₂Cl CCl₃ | 65 | 3 | >70 | Purple |

[a]Mol ratios n-butyl ether:chlorinated hydrocarbon:TiCl₄ per 1 mol TiCl₃ in reduced solids.
[b]Catalyst properties:
Catalyst Efficiency, W/W: 82
C₇ Insolubles, %: 97.6

The results of Table V, the unexpected synergism of TiCl₄ with various chlorohydrocarbons having stable chloride-carbon bonds in activating the reduced solids and concomitantly increasing of the yield of treated catalyst. At the treatment conditions employed, none of the catalysts were activated by crystal conversion without the TiCl₄ in the activation system (Examples 16, 18, 20, and 22). Additionally, catalyst yield of these Examples were extremely low. However, in those Examples where the TiCl₄ was present (17, 29, 21,23), catalyst yields were increased and crystal conversions obtained.

It will be noted that each of the chlorinated hydrocarbons of Table V have more stable chloridecarbon bonds than hexachloroethane.

COMPARATIVE EXAMPLES 12–13

Two samples (5.0 g) of brown, beta-crystalline reduced solids prepared according to the general procedure described above, were respectively treated with specified combinations of n-butyl ether and tetrachloroethylene (a chlorinated hydrocarbon with vinyllic chloride bond) as described above. The recovered catalysts were then tested in the above-described polymerization system. The activation conditions and results are tabulated in Table VI.

TABLE VI

| Comparative Example No. | Activation System[a] E: | RX: | TiCl₄ | Treatment °C. | Hrs | Yield % | Cat. Eff., W/W | Catalyst Properties C₇ Insol. % | Composition Mol Ratio Al:Ti | Wt. % Al,Ti,Cl[b] |
|---|---|---|---|---|---|---|---|---|---|---|
| 12 | 0.8 | 1.0 | 0 | 80 | 4 | — | 75 | 64 | 0.11 | 93 |
| 13 | 0.8 | 1.2 | 0 | 80 | 5 | — | 131 | 71 | 0.07 | 93 |

[a]Mol ratios of Bu₂O:C₂Cl₄:TiCl₄ per 1 mol TiCl₃ in reduced solids.
[b]Weight percent, as determined by x-ray fluorescence.

The results of Table VI show that the activation system of n-butyl ether and tetrachloroethylene and treatment conditions employed did not result in crystal conversion of the reduced solids.

EXAMPLES 24–30

Several samples (5.0 g) of brown, beta-crystalline reduced solids prepared according to the general procedure described above were treated with varying amounts of tetrachloroethylene, TiCl₄ and n-butyl ether (added in that order) under varying conditions, all as specified in Table III. The resulting catalysts, recovered as previously described herein, were then tested in the abovedescribed polymerization system. Details of the Examples are set forth in the following Table VII.

TABLE VII

| Example No. | Activation System[a] E: | RX: | TiCl₄ | Treatment °C. | Hrs | Yield % | Cat. Eff., W/W | Catalyst Properties C₇ Insol. % | Composition Mol Ratio Al:Ti | Wt. % Al,Ti,Cl[b] |
|---|---|---|---|---|---|---|---|---|---|---|
| 24 | 0.6 | 0.5 | 1 | 85 | 3 | 135 | 78 | 96.1 | 0.09 | 100 |
| 25 | 0.6 | 1 | 2 | 65 | 5 | 134 | 60 | 94.9 | 0.08 | 100 |
| 26 | 0.6 | 1 | 2 | 65 | 3 | 134 | 71 | 95.2 | 0.08 | 101 |
| 27 | 1 | 1 | 2 | 65 | 3 | 133 | 90 | 97.3 | 0.10 | 105 |
| 28 | 0.6 | 1 | 2 | 65 | 1 | 125 | 62 | 92.5 | 0.11 | 100 |
| 29 | 0.6 | 1 | 2 | 65 | 2 | 97 | 128 | 98.0 | 0.04 | 92 |
| 30 | 0.1 | 1 | 2 | 65 | 2 | 148 | 35 | 89.0 | 0.81 | 101 |

[a]Mol ratios of Bu₂O:C₂Cl₄:TiCl₄ per 1 mol TiCl₃
[b]Weight percent, as determined by x-ray fluorescence.

A comparison of the results of Table VII (Examples 24–29) to those of Table VI (Comparative Examples 12–13) shows that the addition of a small amount of TiCl₄ to the n-butyl ether/C₂Cl₄ activation system results in crystal conversion of the reduced solids, even at milder treatment conditions of 65° C. Compare C₇ Insol. % of said Examples. Example 30 shows the necessity of utilizing more than about 0.1 mol n-butyl ether:1 mol TiCl₃ in the reduced solids in order to obtain catalyst crystal conversion.

EXAMPLES 31–37

Seven samples (5.0 g) of brown, beta-crystalline reduced solids prepared according to the general procedure described above were treated with specified amounts of titanium tetrachloride, n-butyl ether and specified chlorinated hydrocarbons having a vinyllic chlorine-bond under varying conditions, all as specified in Table III. The resulting catalysts were recovered, tested in the polymerization system and observed for color, all as previously described. Details of the Examples are set forth in the following Table VIII.

TABLE VIII

| Example No. | Activation System[a] E: | RX: | TiCl₄ | RX | Treatment °C. | Hrs | Yield % | Catalyst Properties Cat. Eff., W/W | C₇ Insol. % | color |
| --- | --- | --- | --- | --- | --- | --- | --- | --- | --- | --- |
| 31 | 0 | 2 | 0 | chlorobenzene | 110 | 2 | 100 | 51 | 90 | Brown |
| 32 | 0 | 2 | 0 | p-chloroanisole | 90 | 2 | 101 | 67 | 70 | Brown |
| 33 | 0 | 2 | 0 | p-chloroanisole | 110 | 2 | 100 | 7 | 80 | Brown |
| 34 | 0.7 | 1 | 0 | benzyl chloride | 80 | 5 | 100 | 34 | 94 | Brown |
| 35 | 1.0 | 2 | 0 | chlorobenzene | 110 | 2 | 91 | 57 | 80 | Brown |
| 36 | 0.7 | 1.2 | 0 | chlorobenzene | 90 | 2 | 92 | 61 | 75.0 | Brown |
| 37 | 0.7 | 1.2 | 1 | chlorobenzene | 90 | 2 | 100 | 81 | 96.8 | Purple |

[a]Mol ratios n-butyl ether-chlorinated hydrocarbon:TiCl₄ per 1 mol TiCl₃ in reduced solids.

The results of Table VIII show that, even at high activation conditions, the employment of chlorobenzene, p-chloroanisole or benzyl chloride, either alone or with n-butyl ether in the activation system did not result in crystal conversion of the reduced solids. However, as shown by Example 37, the addition of only a minor amount of titanium tetrachloride to the chlorobenzene and n-butyl ether resulted in such crystal conversion (verified by catalyst properties) at the same activation conditions of Example 36.

What is claimed is:

1. In a process for the stereopolymerization of alpha-olefins wherein an alpha-olefin is contacted with a cocatalyst system comprising a titanium trichloride containing compound catalyst and an aluminum alkyl, as cocatalyst, under polymerization conditions, the improvement comprising:

employing as said titanium trichloride compound catalyst component a titanium trichloride catalyst complex produced by a process comprising:

(a) contacting titanium tetrachloride with an organo metal compound of the formula $R_nAlX_{3-n}$, wherein R is a group having 1 to 18 carbon atoms selected from alkyl or aryl, X is a halogen and n is a numeral within the range of $1 \leq n \leq 3$ at about $-50°$ to about $100°$ C. in an inert diluent to obtain a reduced solids product;

(b) cntacting the reduced solids of (a) simultaneously with a chlorinated hydrocarbon and titanium tetrachloride in the presence of a Lewis base complexing agent, said chlorinated hydrocarbon, titanium tetrachloride and Lewis base complexing agent being present in amounts of about 0.1 to about 10 mols chlorinated hydrocarbon, about 0.1 to about 2.0 mols titanium tetrachloride and about 0.1 to about 2.0 mols Lewis base complexing agent per one mole of titanium trichloride in the reduced solids of (a), and said titanium tetrachloride being in a concentration of about 2 to about 15 volume percent at an elevated temperature within the range of from about $50°$ C. to about $150°$ C. for about 5 minutes to about 10 hours until a crystal conversion of the reduced solids product of (a) is obtained; and (c) recovering the resulting activated reduced solids product as said titanium trichloride catalyst complex in high yield.

2. The process of claim 1 wherein the alpha-olefin comprises at least propylene.

3. The process of claim 1 wherein said step (b) is carried out under conditions of elevated temperature, for a time and at a titanium tetrachloride concentration such that the recovered titanium trichloride catalyst complex of (c) has alpha-olefin polymerization properties superior to titanium trichloride catalyst complexes obtained by treating the reduced solids of (a) under the same conditions of elevated temperature and time in the absence of said titanium tetrachloride or said chlorinated hydrocarbon.

4. The process of claim 1 wherein said step (b) is carried out under conditions of elevated temperature, for a time and at a titanium tetrachloride concentration such that the activated reduced solids recovered in step (c) is greater than the amount of titanium trichloride catalyst complexes obtained by treating the reduced solids of (a) under the same conditions of elevated temperature and time in the absence of said titanium tetrachloride.

5. The process of claim 1 wherein the chlorinated hydrocarbon is selected from chlorinated saturated hydrocarbons, chlorinated unsaturated hydrocarbons or mixtures thereof, said chlorinated hydrocarbons having from 1 to 8 carbon atoms per molecule.

6. The process of claim 5 wherein the chlorinated hydrocarbon is hexachloroethane, the Lewis base complexing agent is n-butyl ether and the mol ratio of n-butyl ether to hexachloroethane to titanium tetrachloride is about 0.6:1:1.

7. The process of claim 5 wherein said chlorinated hydrocarbon is tetrachloroethylene, the ether is n-butyl ether and the mol ratio of n-butyl ether to tetrachloroethylene to titanium tetrachloride is about 0.6:1:2.

* * * * *